Sept. 16, 1941.    E. G. PARTRIDGE    2,256,408
METHOD OF MAKING MICROPOROUS RUBBER ARTICLES
Filed Sept. 11, 1936
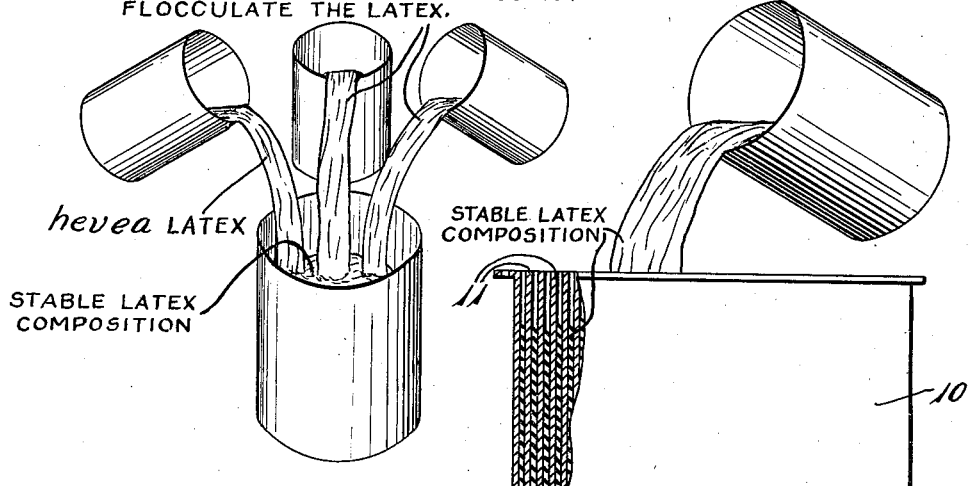
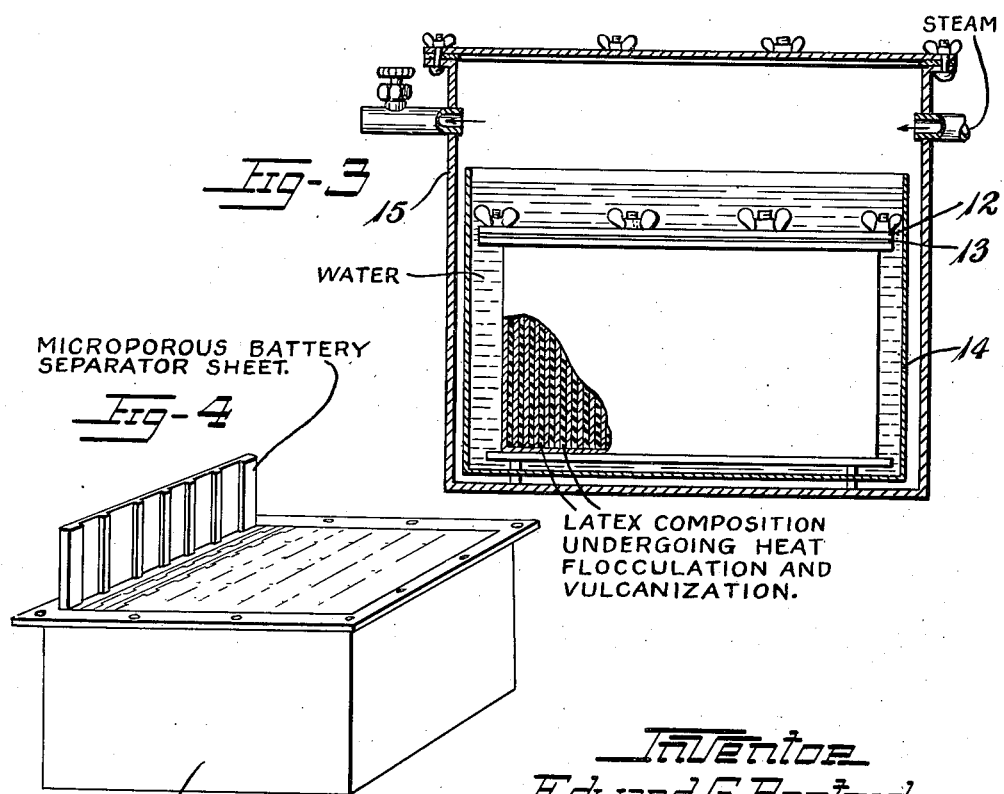

Patented Sept. 16, 1941

2,256,408

UNITED STATES PATENT OFFICE 2,256,408

METHOD OF MAKING MICROPOROUS RUBBER ARTICLES

Edward G. Partridge, Stow, Ohio, assignor to The B. F. Goodrich Company, New York, N. Y., a corporation of New York Application September 11, 1936, Serial No. 100,333

7 Claims. (Cl. 260—723)

This invention relates to the manufacture of microporous rubber articles such as separator sheets for storage batteries, filters, and the like, and has for its principal objects the provision of simple, economical, and efficient procedure for manufacturing such articles from Hevea rubber latex; the elimination of difficulties and disadvantages inherent in prior processes; and in general, the production of superior microporous products and the provision of an efficient and more satisfactory method of making such products.

It has heretofore been proposed to gel Hevea latex and to vulcanize the resulting latex gel under conditions preventing the evaporation or escape of water to produce microporous rubber. In all such methods of which applicant is aware, some chemical agent has been added to the latex to produce the requisite gellation. Such agents as acetic acid, sulfur dioxide, magnesium sulfate, diphenyl guanidine, a combination of diphenyl guanidine and ethylene diamine, and other similar substances capable of effecting a more or less rapid gellation, flocculation, or coagulation of latex at normal or elevated temperatures have been added to the latex in varying quantities for this purpose. While such prior practices are capable of producing excellent products when properly controlled, they have not proven entirely satisfactory, especially for commercial manufacturing operations, because of the close control and high degree of care required to produce consistently satisfactory results. Relatively slight variations in the quantity of some of the gelling agents used, or in the speed or manner in which they are added to the latex, frequently will produce serious variations and defects in the products with consequent reduction or practically complete loss of value, and in some cases may result in immediate complete coagulation of the latex and its total loss for the intended purpose. Even a properly gelled latex, if permitted to stand too long before vulcanizing, will become coagulated. Such losses, coupled with the cost of the gelling agents and the added expense incident to the necessary careful control of manufacturing operations, materially increase the cost of products made by prior methods, and become an important consideration in the manufacture of articles such as battery separator sheets which must be sold in a highly competitive market demanding a minimum selling price. Furthermore, some of the added gelling agents interfere with or retard vulcanization of the rubber, necessitating suitable adjustment of the rubber composition or possibly an increase in the time of vulcanization, and in separator sheets may have a deleterious chemical effect in the battery.

All such difficulties and disadvantages accruing from the addition of gelling or flocculating agents to the latex, are entirely eliminated by the present invention which makes possible the production of excellent microporous rubber products from a stable Hevea latex without the addition of any agents tending to gel, flocculate, or coagulate the latex. According to the present invention a vulcanizable stable Hevea latex composition is flocculated solely by heating, preferably simultaneously with the early stages of vulcanization, and then is vulcanized to a desired state of soft or hard rubber under conditions prohibiting evaporation of water to produce excellent microporous rubber, as will more clearly appear from the following specific examples illustrative of the invention.

*Example 1.*—A flowable composition was prepared consisting of 100 parts by weight of the ammonia-preserved, centrifugally-concentrated, Hevea latex of commerce containing about 60% total solids, 30 parts of sulfur added as a 50% concentration aqueous dispersion containing a small quantity of dispersing agents. A suitable mold was filled with the composition and immersed in water in a closed container and heated for four hours at 300° F. A hard-vulcanized molded rubber product pervaded by microscopic pores of a fineness comparable to prior products was found to have been produced.

*Example 2.*—A freely flowable composition is prepared consisting of 100 parts by weight of ammonia-preserved, centrifugally-concentrated Hevea latex containing about 60% total solids, 3 parts of sulfur added as a 50% concentration aqueous dispersion, 3 parts of zinc oxide added as a 35% concentration aqueous dispersion, and 0.25 part of an organic accelerator of vulcanization of the butyraldehyde-aniline condensation product type added as a 20% concentration aqueous dispersion, the dispersions of course containing the usual quantities of dispersing and/or stabilizing agents overcoming, in the case of zinc oxide, any slight tendency to thicken the latex. A mold is filled with the composition and vulcanized under water for thirty minutes at 290° F. A soft vulcanized microporous rubber product is produced.

*Example 3.*—A flowable composition is prepared consisting of 100 parts by weight of ammonia-preserved concentrated latex of commerce containing about 60% total solids, 25 parts of sulfur added as a 45% aqueous dispersion, and 0.6 part of an organic accelerator such as a polybutyraldehyde-aniline condensation product added as a 20% aqueous dispersion. A mold designed to produce a storage battery separator sheet is filled with the composition, immersed in water in a closed container, and heated for two hours at 290° F. The resulting product was a microporous hard rubber separator sheet of excellent physical strength and entirely satisfactory porosity and electrical resistance properties.

One method of practicing the present invention is illustrated more or less diagrammatically in the accompanying drawings, in which no attempt has been made to portray details of the equipment used as it is well known in the art. Of the drawings:

Fig. 1 is a diagrammatic perspective view illustrating the step of preparing the flowable latex composition utilized in the process;

Fig. 2 is a somewhat similar view illustrating the step of placing the latex composition in a mold;

Fig. 3 is a side elevation partially sectioned and broken away, illustrating the step of heating the mold and contained latex under non-evaporative conditions;

Fig. 4 is a perspective view illustrating the step of removing the finished microporous battery separator plate from the mold.

Referring to the drawings, a suitable quantity of Hevea latex and appropriate vulcanizing agents which do not flocculate the latex, as more fully set forth in the foregoing specific examples, are thoroughly mixed as illustrated diagrammatically in Fig. 1, to prepare a vulcanizable latex composition which is stable and may be stored indefinitely without appreciable change other than such change as accompanies ageing of any ordinary latex composition. A suitable quantity of the prepared stable composition is then poured into a mold box 10, which is provided with suitably spaced removable mold plates 11, 11 designed to produce a number of battery separator sheets. The filled mold box is sealed by means of a tight-fitting cover 12 and gasket 13, and is placed in a container 14 which is filled with water to a depth sufficient to cover the mold box 10. The container 14, in turn, is enclosed by a steam chest 15, to which steam may be admitted under pressures appropriate to attain the required flocculating and vulcanizing temperatures. The latex within the mold is heated by steam for the time and at the temperature as specific in the foregoing examples until the latex is flocculated to produce a reticular rubber network and the net work is vulcanized to the hard rubber stage, evaporation of water from the latex of course being impossible under the conditions described.

After flocculation and vulcanization of the latex have been completed, the mold box 10 is opened, and the finished microporous battery separator sheets are removed from the mold as illustrated diagrammatically in Fig. 4.

The process of the present invention is so simple as to be practically fool-proof. Uniformly satisfactory microporous articles may be consistently produced by unskilled operators, and defective articles and material losses resulting from premature coagulation or improper gellation of the latex as in prior processes are entirely eliminated. The latex compositions utilized are quite stable and may be stored indefinitely without appreciable change. Substantial manufacturing economies are therefore effected without sacrifice of quality in the product but with a resulting production of more uniformly high quality products.

While the invention has been described in considerable detail with reference to certain preferred procedures and materials, it is understood that numerous modifications and variations therein are possible. Thus, any desired fillers or compounding materials may be included in the latex composition so long as they have no substantial flocculating or gelling effect on the latex. For example, other organic accelerators such as the various aldehyde-amine condensation products, mercaptobenzothiazole, zinc dithiocarbamate and the like which do not substantially flocculate or gel latex may be used in place of the specific accelerators mentioned. Similarly, the term "Hevea latex" as herein used is intended to include the well known natural latex of the tree *Hevea brasiliensis* and analogous latices whether compounded or uncompounded, thickened, thinned, concentrated, diluted, stabilized, creamed, or otherwise prepared for use. All such modifications and variations are included within the spirit and scope of the invention as defined by the appended claims.

I claim:

1. The method of making a microporous rubber product which comprises preparing a stable, flowable latex composition in an unvulcanized but vulcanizable condition by admixing only Hevea latex and compounding ingredients, including vulcanizing agents, of such character as not materially to impair the stability of the composition, placing an appropriate quantity of the flowable composition in a mold, and progressively flocculating the composition and vulcanizing the rubber under conditions prohibiting substantial escape of water from the composition, the flocculation and vulcanization being effected solely by heating the composition, the heating being initiated while the composition is in a flowable condition and being continued until a solid, vulcanized microporous product is obtained.

2. The method of making a microporous rubber product which comprises preparing a stable, flowable latex composition in an unvulcanized but vulcanizable condition by admixing only ammonia-preserved Hevea latex and dispersed vulcanizing agents including sulfur and an organic accelerator of vulcanization selected from the class consisting of aldehyde-amine condensation products, mercapto thiazoles, and metallic dithiocarbamates, the character of all said dispersed vulcanizing agents being such as not materially to impair the stability of the composition, placing an appropriate quantity of the flowable composition in a mold, and progressively flocculating the composition and vulcanizing the rubber under conditions prohibiting substantial escape of water from the composition, the flocculation and vulcanization being effected solely by heating the composition, the heating being initiated while the composition is in a flowable condition and being continued until a solid, vulcanized microporous product is obtained.

3. The method of making a microporous rubber product which comprises preparing a stable, flowable latex composition in an unvulcanized but vulcanizable condition by admixing only ammonia-preserved Hevea latex and dispersed vulcanizing agents including sulfur and an organic accelerator of vulcanization comprising a butyraldehyde-aniline condensation product, the character of all said dispersed vulcanizing agents being such as not materially to impair the stability of the composition, placing an appropriate quantity of the flowable composition in a mold, and progressively flocculating the composition and vulcanizing the rubber under conditions prohibiting substantial escape of water from the composition, the flocculation and vulcanization being effected solely by heating the composition, the heating being initiated while the composition is in a flowable condition and being continued until a solid, vulcanized microporous product is obtained.

4. The method of making a microporous rubber product which comprises preparing a stable, flowable latex composition in an unvulcanized but vulcanizable condition by admixing only concentrated, preserved Hevea latex and a dispersion of sulfur of such character as not materially to impair the stability of the composition, placing an appropriate quantity of the flowable composition in a mold, and progressively flocculating the composition and vulcanizing the rubber under conditions prohibiting substantial escape of water from the composition, the flocculation and vulcanization being effected solely by heating the composition, the heating being initiated while the composition is in a flowable condition and being continued until a solid, vulcanized microporous product is obtained.

5. A vulcanized microporous latex rubber product free of deleterious agents such as latex gelling agents, flocculating agents and coagulating agents, which product has been prepared by the method of claim 1.

6. A vulcanized microporous latex rubber product free of deleterious agents such as latex gelling agents, flocculating agents and coagulating agents, which product has been prepared according to the method of claim 2.

7. A vulcanized microporous latex rubber product free of deleterious agents such as latex gelling agents, flocculating agents and coagulating agents and containing no materials other than rubber, sulfur and incidental dispersing and latex stabilizing agents, which product has been prepared according to the method of claim 4.

EDWARD G. PARTRIDGE.